United States Patent
Joshi et al.

(10) Patent No.: US 10,251,101 B2
(45) Date of Patent: Apr. 2, 2019

(54) METHODS, NETWORK NODES, COMMUNICATION DEVICE, COMPUTER PROGRAMS AND COMPUTER PROGRAM PRODUCTS FOR RE-ESTABLISHMENT OF A CONNECTION

(71) Applicant: TELEFONAKTIEBOLAGET LM ERICSSON (PUBL), Stockholm (SE)

(72) Inventors: Varun Joshi, Akola (IN); Rahul Krishna, Chennai (IN); Krishna Mohan Menon, Ernakulam (IN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 15/739,050

(22) PCT Filed: Jun. 24, 2015

(86) PCT No.: PCT/IN2015/050049
§ 371 (c)(1),
(2) Date: Dec. 21, 2017

(87) PCT Pub. No.: WO2016/207904
PCT Pub. Date: Dec. 29, 2016

(65) Prior Publication Data
US 2018/0192332 A1 Jul. 5, 2018

(51) Int. Cl.
*H04W 36/00* (2009.01)
*H04W 76/19* (2018.01)
(Continued)

(52) U.S. Cl.
CPC ... *H04W 36/0033* (2013.01); *H04W 36/0055* (2013.01); *H04W 36/305* (2018.08); *H04W 76/19* (2018.02); *H04W 36/08* (2013.01)

(58) Field of Classification Search
CPC ......... H04W 36/0033; H04W 36/0055; H04W 36/305; H04W 36/08; H04W 76/19
See application file for complete search history.

(56) References Cited

U.S. PATENT DOCUMENTS

| | | | |
|---|---|---|---|
| 8,218,505 | B2 | 7/2012 | Iwamura et al. |
| 2012/0077509 | A1 | 3/2012 | Huang |

(Continued)

FOREIGN PATENT DOCUMENTS

| | | |
|---|---|---|
| CN | 103108403 A | 5/2013 |
| CN | 103782628 A | 5/2014 |
| WO | 2009075341 A1 | 6/2009 |

OTHER PUBLICATIONS

International Search Report and Written Opinion dated Dec. 21, 2015, in International Application No. PCT/IN2015/050049, 9 pages.

(Continued)

*Primary Examiner* — Wayne H Cai
(74) *Attorney, Agent, or Firm* — Rothwell, Figg, Ernst & Manbeck, P.C.

(57) ABSTRACT

A method (100) performed in a target network node (12) is provided for re-establishing a connection to a communication device (11). The method (100) comprises receiving (101), from the communication device (11), a request for a re-establishment of the connection, the request comprising a first identifier identifying a management node (14) and a second identifier uniquely identifying a source cell of the communication device (11); obtaining (102) a context for the communication device (11) based on at least one of the first identifier and the second identifier; and re-establishing (103) the connection to the communication device (11). Methods in source network node (13), management node (14) and communication devices (11) are also provided, and (Continued)

corresponding nodes, computer programs and computer program products.

6 Claims, 15 Drawing Sheets

(51) Int. Cl.
*H04W 36/30* (2009.01)
*H04W 36/08* (2009.01)

(56) References Cited

U.S. PATENT DOCUMENTS

| | | | |
|---|---|---|---|
| 2014/0179325 A1 | 6/2014 | Xu et al. | |
| 2014/0295838 A1* | 10/2014 | Won | H04W 60/04 455/435.1 |
| 2015/0056999 A1 | 2/2015 | Olofsson et al. | |
| 2015/0312813 A1* | 10/2015 | Xu | H04W 36/0055 455/438 |
| 2018/0279174 A1* | 9/2018 | Yannick | H04W 8/065 |

OTHER PUBLICATIONS

3GPP, 3rd Generation Partnership Project; Technical Specification Group Radio Access Network; Evolved Universal Terrestrial Radio Access (E-UTRA); Radio Resource Control (RRC); Protocol specification (Release 12), 3GPP TS 36.331 V12.5.0, 2015, 445 pages.
ETSI, Technical Specification, LTE; Evolved Universal Terrestrial Radio Access (E-UTRA); Radio Resource Control (RRC); Protocol specification ETSI TS 136 331 V11.8.0 (Jul. 2014), 3GPP TS 36.331 V11.8.0, 2014, 359 pages.
Extended European Search Report dated Nov. 7, 2018, issued in European Patent Application No. 15896248.0, 15 pages.

* cited by examiner

```
-- ASN1START
RRCConnectionReestablishmentRequest ::= SEQUENCE {
    criticalExtensions                      CHOICE {
        rrcConnectionReestablishmentRequest-r8    RRCConnectionReestablishmentRequest-r8-IEs,
        criticalExtensionsFuture                  SEQUENCE {}
    }
}

RRCConnectionReestablishmentRequest-r8-IEs ::= SEQUENCE {
    ue-Identity                 ReestabUE-Identity
    reestablishmentCause        ReestablishmentCause,       ①
    spare                       BIT STRING (SIZE (2))       ②
}

ReestabUE-Identity ::= SEQUENCE {
    c-RNTI          C-RNTI,
    physCellId      PhysCellId,
    shortMAC-I      ShortMAC-I
}

ReestablishmentCause ::= ENUMERATED {
    reconfigurationFailure, handoverFailure
    otherFailure, spare}

-- ASN1STOP
```

```
RRC: rrcConnectionReestablishmentRequest
rnti:1339 phCellId:409 eCause:otherFailure RRC {
    pdu value UL-CCCH-Message ::= {
        message c1 : rrcConnectionReestablishmentRequest : {
            criticalExtensions rrcConnectionReestablishmentRequest-r8 : {
                ue-Identity {
                    C-RNTI '00000101 00111011'B              ③
                    physCellId 409,
                    ShortMAC-I '01000101 01011100'B
                },
```

Fig. 2

```
RRC: rrcConnectionReestablishment (UE:135385182)
cxMode:3(OL-MIMO)

[2013-08-13 06:33:15.072] 000100/LmCellPT6(Ft_RRC_ASN) elibInsRrcP
BUS_SEND:UE_TRACE: CellId 17, RacUeRef 135385182, Encode RRC PDU R
Length = 20 bytes)
0000   00 02 97 30 0F 95 51 6A A6 B6 70 00 37 14 22 86     '...0..Qj.
0010   82 40 78 00                                          '.@x.'
RRC {
    pdu value DL-CCCH-Message ::= {
        message c1 : rrcConnectionReestablishment : {
            rrc-TransactionIdentifier 0,
            CriticalExtensions c1 : rrcConnectionReestablishment-r8 : {
```

Fig. 3

```
RRC: rrcConnectionReestablishmentComplete (UE:135385182)

[2013-08-13 06:33:15.116] 000100/LmCellPT6(Ft_RRC_ASN) eliblnsRrCprorocolID.cc:415
BUS_RECEIVE:UE_TRACE: CellId 17, RacUeRef 135385182, Decode RRC PDU RRCUL_DCCH_Message
Length = 2 bytes)
0000   18 00
RRC {
    pdu value UL-DCCH-Message ::= {
        message c1 : rrcConnectionReestablishmentComplete : {
            rrc-TransactionIdentifier 0,
            criticalExtensions rrcConnectionReestablishmentComplete-r8 : {}
```

Fig. 5

```
-- ASN1START
RRCConnectionReestablishmentRequest ::= SEQUENCE {
    criticalExtensions              CHOICE {
        rrcConnectionReestablishmentRequest-r8      RRCConnectionReestablishmentRequest-r8-IEs,
        criticalExtensionsFuture    SEQUENCE {}
    }
}

RRCConnectionReestablishmentRequest-r8-IEs ::= SEQUENCE {    ⎫
    ue-Identity                 ReestabUE-Identity,          ⎬ ①
    reestablishmentCause        ReestablishmentCause,        ⎪
    spare                       BIT STRING (SIZE (2))        ⎭
}

ReestabUE-Identity ::=      SEQUENCE {     ⎫
    c-RNTI                  C-RNTI,        ⎬ ②
    CGID                    CGID,          ⎪
    GUMMEI                  GUMMEI         ⎪
    shortMAC-I              ShortMAC-I     ⎭
}

ReestablishmentCause ::=    ENUMERATED {
    reconfigurationFailure, handoverFailure,
    otherFailure, spare1}

-- ASN1STOP
```

Fig. 8

| | | | |
|---|---|---|---|
| 11:10:59.107 | MS1 | ERRC | ↑RRC Connection Reconfiguration |
| 11:11:12.534 | MS1 | ERRC | ↑Measurement Report (UL-DCCH) |
| 11:11:12.071 | MS1 | ERRC | ↑Measurement Report (UL-DCCH) |
| 11:11:12.183 | MS1 | ERRC | ↑Measurement Report (UL-DCCH) |
| 11:11:15.206 | MS1 | ERRC | →RRC Connection Reconfiguration |
| 11:11:15.272 | MS1 | ERRC | ↑RRC Connection Reconfiguration |
| 11:11:15.284 | MS1 | ERRC | →System Information Block Type1 |
| 11:11:15.300 | MS1 | ERRC | →RRC Connection Reconfiguration |
| 11:11:15.300 | MS1 | ERRC | ↑RRC Connection Reconfiguration |
| 11:11:15.323 | MS1 | ERRC | →System Information (DL-BCCH-S |
| 11:11:15.323 | MS1 | | →System Information Block 2 |

Message Details
System Frame Number
System frame number : N/A
Sub frame number : N/A
Message Type : BcchSchDownlink
Message Length . 22
Plmn-IdentityList
PLMN-IdentityList:
 [0 ] :
  plmn-Identity
   mcc
    MCC :
     [0] : 2
     [1] : 6
     [2] : 2
   mnc
    MNC :
     [0] : 0
     [1] : 2
  cellReservedForOperatorUse : notReserved
  trackingAreaCode : 44111 (0xAC4F)
  cellIdentity : 10654210 (0xA29202)
  cellBarred : notBarred
  intraFreqRedelection : allowed
  csg-Indication : False
  q-RxLevMin : -64
  freqBandIndicator : 20

Fig. 9

METHODS, NETWORK NODES, COMMUNICATION DEVICE, COMPUTER PROGRAMS AND COMPUTER PROGRAM PRODUCTS FOR RE-ESTABLISHMENT OF A CONNECTION

CROSS REFERENCE TO RELATED APPLICATION(S)

This application is a 35 U.S.C. § 371 National Phase Entry Application from PCT/IN2015/050049, filed Jun. 24, 2015, designating the United States, the disclosure of which is incorporated herein in its entirety by reference.

TECHNICAL FIELD

The technology disclosed herein relates generally to the field of wireless communications and in particular to methods and means for re-establishing connections.

BACKGROUND

Whenever a communications device, in the following denoted user equipment (UE), is connected to a communications network for obtaining a service, such as a data session or a voice session, the user of the device expects continued service without interruption. If the service is frequently disconnected, it would lead to a poor user perception and dissatisfaction, which will also affect the operator revenues.

Hence acknowledging the importance of retaining a call, there are various methodologies to improve the retainability in the communications network. One such methodology is network assisted re-establishment of connections. Whenever a failure occurs in the radio connection, the UE may attempt to re-establish the existing connection rather than starting from the beginning. Such re-establishment improves the user perception and leads to a much smaller interruption time than if starting up a connection again. This procedure is, in Long Term Evolution (LTE), called Radio Resource Control (RRC) Connection Re-Establishment.

There are various reasons to a failure in the connection, for instance poor performance for the UE in a currently serving cell or some sudden occurrence, such as a reconfiguration failure. In either case, the UE can perform a RRC Connection Re-establishment in order to recover the connection either to the same cell or, after selecting a suitable target cell, to the target cell. Whenever this re-establishment is carried out and the connection is continued in a cell provided by a target node other than the currently serving node (also denoted source node), the target node needs to obtain the previous information related to the call in order for the connection to indeed be continued.

The initial inputs needed to transfer this information from the source node to the target cell, is provided by the UE. Upon successfully obtaining all the required information, the RRC Connection is re-established and the call (or other service) is continued. Hence, for the call to be re-established in this case, i.e. when the target cell is provided by another node than the serving cell, it is necessary for the UE to provide sufficient information in the uplink and any missing information may lead to failure in the execution.

The current re-establishment methodology also relies on the serving node and the target node exchanging information. This information exchange is however not always possible, e.g. due to inter-vendor issues, and the RRC re-establishment will then not be successful.

SUMMARY

An objective of the present disclosure is to address and solve or at least alleviate at least one of the above mentioned problems.

The objective is according to an aspect achieved by a method performed in a target network node for re-establishing a connection to a communication device. The method comprises receiving, from the communication device, a request for a re-establishment of the connection, the request comprising a first identifier identifying a management node and a second identifier uniquely identifying a source cell of the communication device; obtaining a context for the communication device based on at least one of the first identifier and the second identifier; and re-establishing the connection to the communication device.

The method provides various advantages, such as rendering the re-establishment process more efficient and reliable. The method overcomes the impact on the re-establishment procedure from situations where there might be cell identity conflicts, e.g. physical cell identity (PCI) conflicts, by using an identifier uniquely identifying the source cell. The method also provides an alternative way of fetching a context for the communication device, involving an interface, e.g. S1 interface, between the target network node/source network node and a management node. The method improves on user satisfaction by providing fast re-establishment of a lost connection.

The objective is according to an aspect achieved by a computer program for a target network node for re-establishing a connection to a communications device. The computer program comprises computer program code, which, when executed on at least one processor on the target network node causes the target network node to perform the method as above.

The objective is according to an aspect achieved by a computer program product comprising a computer program as above and a computer readable means on which the computer program is stored.

The objective is according to an aspect achieved by a target network node for re-establishing a connection to a communication device. The target network node is configured to receive, from the communication device, a request for a re-establishment of the connection, the request comprising a first identifier identifying a management node and a second identifier uniquely identifying a source cell of the communication device; obtain a context for the communication device based on at least one of the first identifier and the second identifier; and re-establish the connection to the communication device.

The objective is according to an aspect achieved by a method performed in a source network node for re-establishing a connection to a communications device. The method comprises receiving, from a management node, a request for a context for the communication device; and sending, to the management node, the context for the communication device in response to the request.

The objective is according to an aspect achieved by a computer program for a source network node for re-establishing a connection to a communications device. The computer program comprises computer program code, which, when executed on at least one processor on the source network node causes the source network node to perform the method as above.

The objective is according to an aspect achieved by a computer program product comprising a computer program as above and a computer readable means on which the computer program is stored.

The objective is according to an aspect achieved by a source network node for re-establishing a connection to a communications device. The source network node is configured to: receive, from a management node, a request for a context for the communication device; and send, to the management node, the context for the communication device in response to the request.

The objective is according to an aspect achieved by a method performed in a management network node for re-establishing a connection to a communication device. The method comprises receiving, from a target network node, a request for a context of the communication device, the request comprising a second identifier uniquely identifying a source cell of the communication device and a third identifier identifying the communication device for which the context is requested; obtaining a context for the communication device based on the second identifier and third identifier; and transmitting, to the target network node, the context for the communication device.

The objective is according to an aspect achieved by a computer program for a management network node for re-establishing a connection to a communication device. The computer program comprises computer program code, which, when executed on at least one processor on the management network node causes the management network node to perform the method as above.

The objective is according to an aspect achieved by a computer program product comprising a computer program as above and a computer readable means on which the computer program is stored.

The objective is according to an aspect achieved by a management network node for re-establishing a connection to a communication device. The management network node is configured to receive, from a target network node, a request for a context of the communication device, the request comprising a second identifier uniquely identifying a source cell of the communication device and a third identifier identifying the communication device for which the context is requested; obtain a context for the communication device based on the second identifier and third identifier; and transmit, to the target network node, the context for the communication device.

The objective is according to an aspect achieved by a method performed in a communication device for re-establishment of a connection to a communications network. The method comprises sending, to a target network node, a request for a re-establishment of the connection, the request comprising a first identifier identifying a management node and a second identifier uniquely identifying a source cell of the communication device; and receiving in response to the request a radio resource configuration connection re-establishment message from the target network node, enabling the communication device to re-establish the connection to the communications network.

The objective is according to an aspect achieved by a computer program for a communication device for re-establishing a connection to a communication network. The computer program comprises computer program code, which, when executed on at least one processor on the communication device causes the communication device to perform the method as above.

The objective is according to an aspect achieved by a computer program product comprising a computer program as above and a computer readable means on which the computer program is stored.

The objective is according to an aspect achieved by a communication device for re-establishment of a connection to a communications network. The communication device is configured to send, to a target network node, a request for a re-establishment of the connection, the request comprising a first identifier identifying a management node and a second identifier uniquely identifying a source cell of the communication device; and receive in response to the request a radio resource configuration connection re-establishment message from the target network node, enabling the communication device to re-establish the connection to the communications network.

Further features and advantages of the embodiments of the present teachings will become clear upon reading the following description and the accompanying drawings.

BRIEF DESCRIPTION OF THE DRAWINGS

FIG. 2 illustrates an example of an RRC connection re-establishment request message.

FIG. 3 illustrates an example of an RRC connection re-establishment message.

FIG. 5 illustrates an example of an RRC connection re-establishment complete message.

FIG. 8 illustrates an example of an RRC connection re-establishment request message according to the present teachings.

FIG. 9 illustrates CGID availability in SIB 1 of a serving cell.

DETAILED DESCRIPTION

Figure 1:
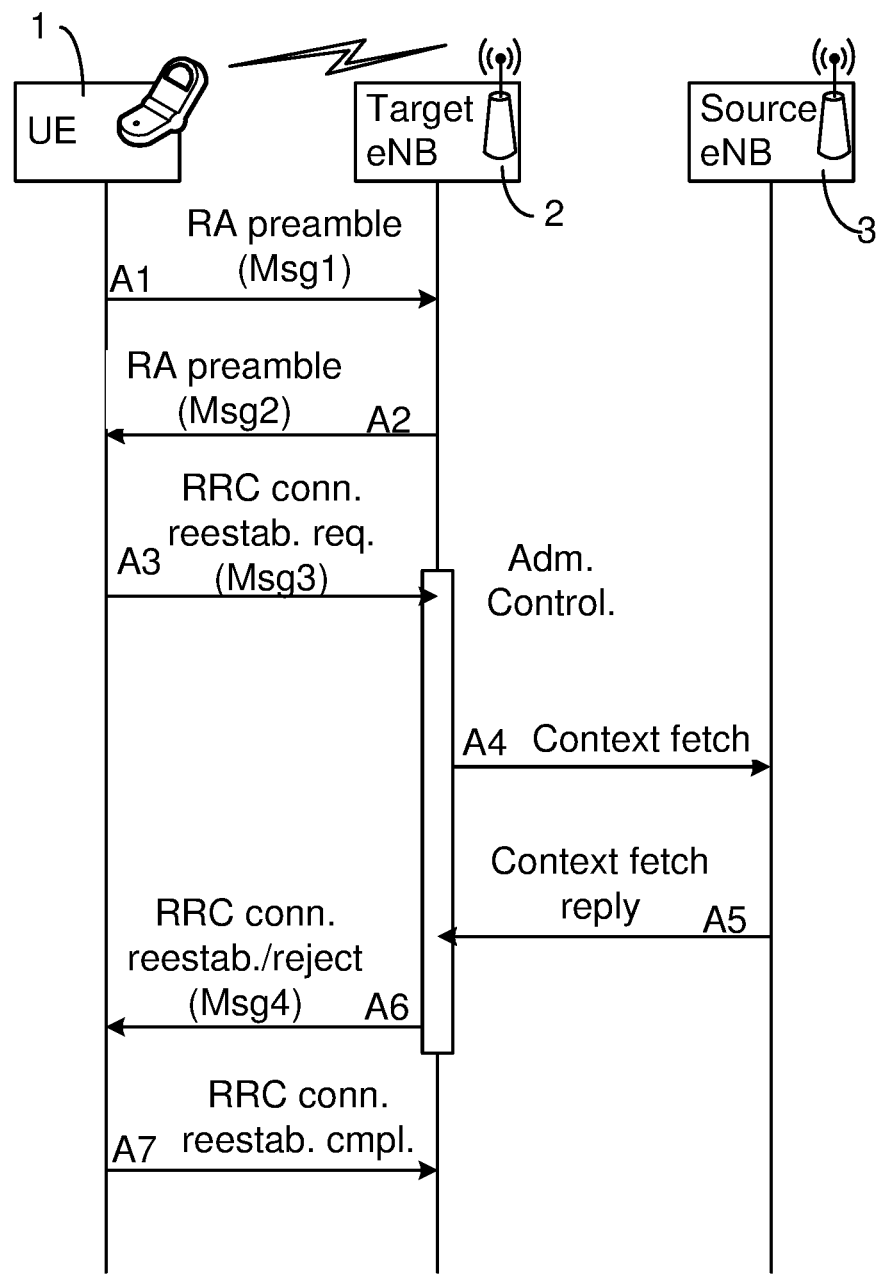
FIG. 1 illustrates signaling of a known RRC Connection Re-Establishment procedure.

In the following description, for purposes of explanation and not limitation, specific details are set forth such as particular architectures, interfaces, techniques, etc. in order to provide a thorough understanding. In other instances, detailed descriptions of well-known devices, circuits, and methods are omitted so as not to obscure the description with unnecessary detail. Same reference numerals refer to same or similar elements throughout the description.

In order to provide a thorough understanding of the present teachings some more details on existing procedures are given in the following, with reference to FIGS. 1-6.

FIG. 1 describes the known RRC Connection re-establishment procedure mentioned in the background section. When a failure occurs on the radio connection, the UE 1 may attempt to re-establish the existing connection. That is, the UE 1 detects a radio link failure and this triggers the RRC connection re-establishment procedure illustrated in FIG. 1. The UE 1 finds a suitable cell based on its re-selection and selection settings, e.g. tries to find a cell to which the signal strength is above a certain threshold level. If the UE 1 is successful in finding a new cell, the UE 1 performs a random access procedure (arrows 1-2) in the beginning of the RRC connection re-establishment procedure.

At arrow A1, the UE 1 selects a random preamble from a range of preambles and sends it in a random access preamble message to a (target) network node of the communications network. In the figure the network node is exemplified by an evolved NodeB (eNB) and denoted target eNB 2. This random access preamble message is also denoted Message 1 (Msg1).

In response, at arrow A2, the target eNB 2 acknowledges the detected preamble by transmitting a random access response message, also denoted RA message 2 (Msg2). The RA message 2 comprises among other things an initial grant to be used on an uplink shared channel, a timing advance (TA) update and a temporary Cell Radio Network Temporary Identifier (C-RNTI).

When the UE 1 receives the RA message 2, it uses the grant to transmit (arrow 3) a RRC connection re-establishment request.

FIG. 2 illustrates the request denoted "RRC Connection Re-establishment Request", which is used in LTE when there is a need to initiate the RRC connection re-establishment procedure. In FIG. 2, "physCellid" is the Physical Cell Identity of the primary cell (PCell) to which the UE was connected prior to the failure, "re-establishment Cause" indicates the failure cause that triggered the re-establishment procedure, and "ue-Identity" is the identity of the UE included in order to enable retrieval of a context for the UE and to facilitate contention resolution by lower layers. The UE context holds e.g. subscription information, capabilities of the UE and also dynamic information such as list of bearers that are established for the UE, which allows faster execution of procedures such as bearer establishment.

The "RRC Connection Re-establishment Request" contains the following fields: (reference is made to FIG. 2)

1. Re-establish UE-Identity (encircled numeral 1 in FIG. 2): Sets the UE-Identity as follows:

Set the C-RNTI to the C-RNTI used in the source PCell (for handover failure and mobility from E-UTRA failure) or used in the PCell in which the trigger for the re-establishment occurred (for other failure cases);

Set the physCellid to the physical cell identity of the source PCell (for handover failure and mobility from E-UTRA failure) or of the PCell in which the trigger for the re-establishment occurred (for other failure cases);

Set the shortMAC-I to the 16 least significant bits of the MAC-I calculated which is used for contention resolution in the new cell, denoted target cell. The short-MAC-I is used for verifying the credibility of the "RRC Connection Re-establishment Request" message.

2. Re-establishment Cause (encircled numeral 2 in FIG. 2): This field indicates the cause of the re-establishment which can be due to reconfiguration failure, handover failure or other failure.

A particular example of the above is illustrated at the lower-most part of FIG. 2, wherein C-RNTI is 1339, PCellid is 409, and the re-establishment cause is "other failure". The ue-identity is then set according to the above, as exemplified at encircled numeral 3.

Reverting now to FIG. 1, once the target eNB 2 receives the RRC connection re-establishment request from the UE 1 it tries to identify the source cell (controlled by source eNB 3) which this physicalCellid (C-RNTI) belongs to. The target eNB 2 may for instance look in its neighbor list to find this out (indicated at box Adm. Control in FIG. 1). The neighbor list (or neighbor cell relation list) is held by eNBs and comprise e.g. mappings between PCI and a globally unique cell identifier, cell global identity (CGID).

When having identified the source eNB 3, the target eNB 2 contacts the source eNB 3 and then fetches the UE context over X2 interface (arrow A4). If the UE context is successfully retrieved from the source eNB 3 (arrow A5), the target eNB 2 replies to the UE 1 with a message "RRC Connection Re-establishment" (arrow A6).

FIG. 3 illustrates the message "RRC Connection Re-establishment" sent from the target eNB 2 to the UE 1. The "RRC Connection Re-establishment" message resolves the contention required to re-establish the signaling radio bearer 1 (SRB1), which is the signaling radio bearer used for RRC messages.

Figure 4A:
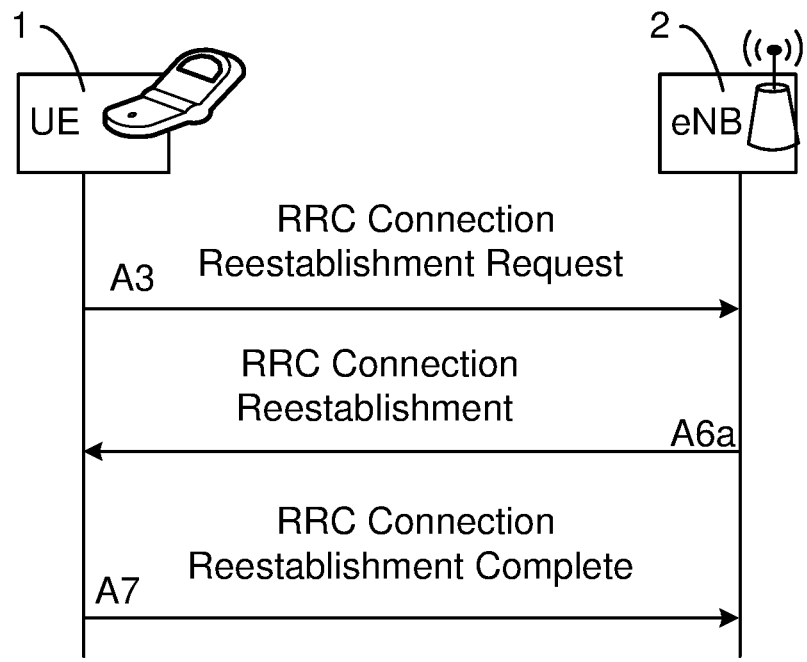
FIG. 4a illustrates signaling of a successful RRC re-establishment procedure.
Figure 4B:
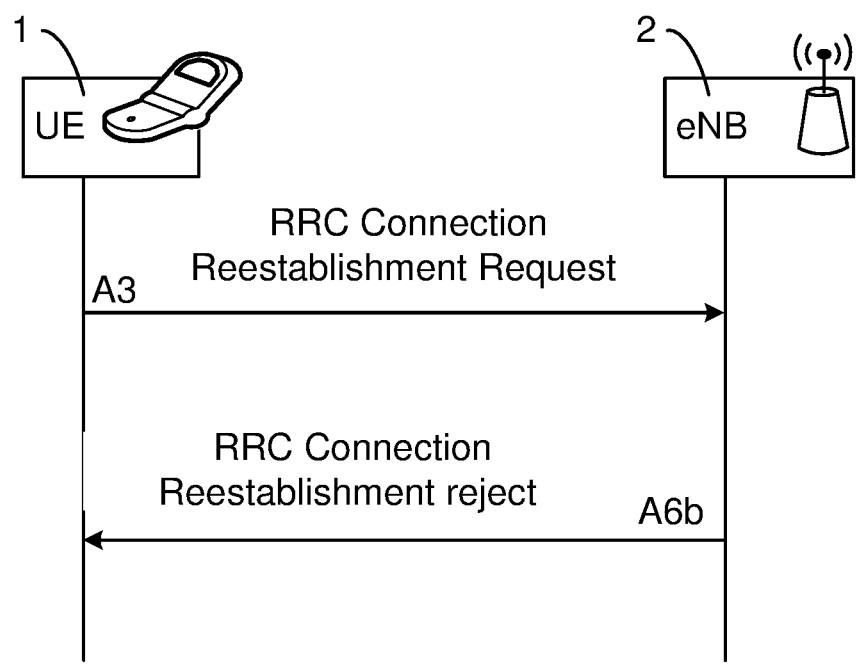
FIG. 4b illustrates signaling of an unsuccessful RRC re-establishment procedure.

There are thus two cases, illustrated in FIGS. 4a and 4b: either the re-establishment request is successful (FIG. 4a) or it is unsuccessful (FIG. 4b).

FIG. 4a illustrates signaling in a successful re-establishment request. The UE 1 has thus sent a re-establishment request (arrow A3, FIG. 1 and FIG. 4a). If the target eNB 2 was successful in fetching the context for the UE 1 from the source eNB 3, then it sends the "RRC Connection Re-establishment" message (arrow 6 in FIG. 1, arrow 6a in FIG. 4a) to the UE 1. The UE 1 replies to the "RRC Connection Re-establishment" message sent from the target eNB 2 with a "RRC Connection Re-establishment complete" message (arrow A7 FIG. 1 and FIG. 4a) to confirm the Re-establishment to the target eNB 2 and once this message reaches the Target Cells, the re-establishment is successful.

FIG. 5 illustrates the "RRC Connection Re-establishment complete" message that is used today. This message may be used also when implementing embodiments according to the present teachings, without any changes required.

FIG. 4b illustrates signaling in case of an unsuccessful re-establishment request. The UE 1 has sent a re-establishment request (arrow A3, FIG. 1 and FIG. 4b). If the target eNB 2 was unsuccessful in fetching the context for the UE 1 from the source eNB 3, then the re-establishment fails and the target eNB 2 sends the "RRC Connection Re-establishment reject" message (arrow 6 in FIG. 1, arrow 6b in FIG. 4b) to the UE 1. The UE 1 moves to a state denoted RRC IDLE state. In this state the UE 1 has lost its connection to the communications network and has to start over again for obtaining a new connection.

Figure 6:
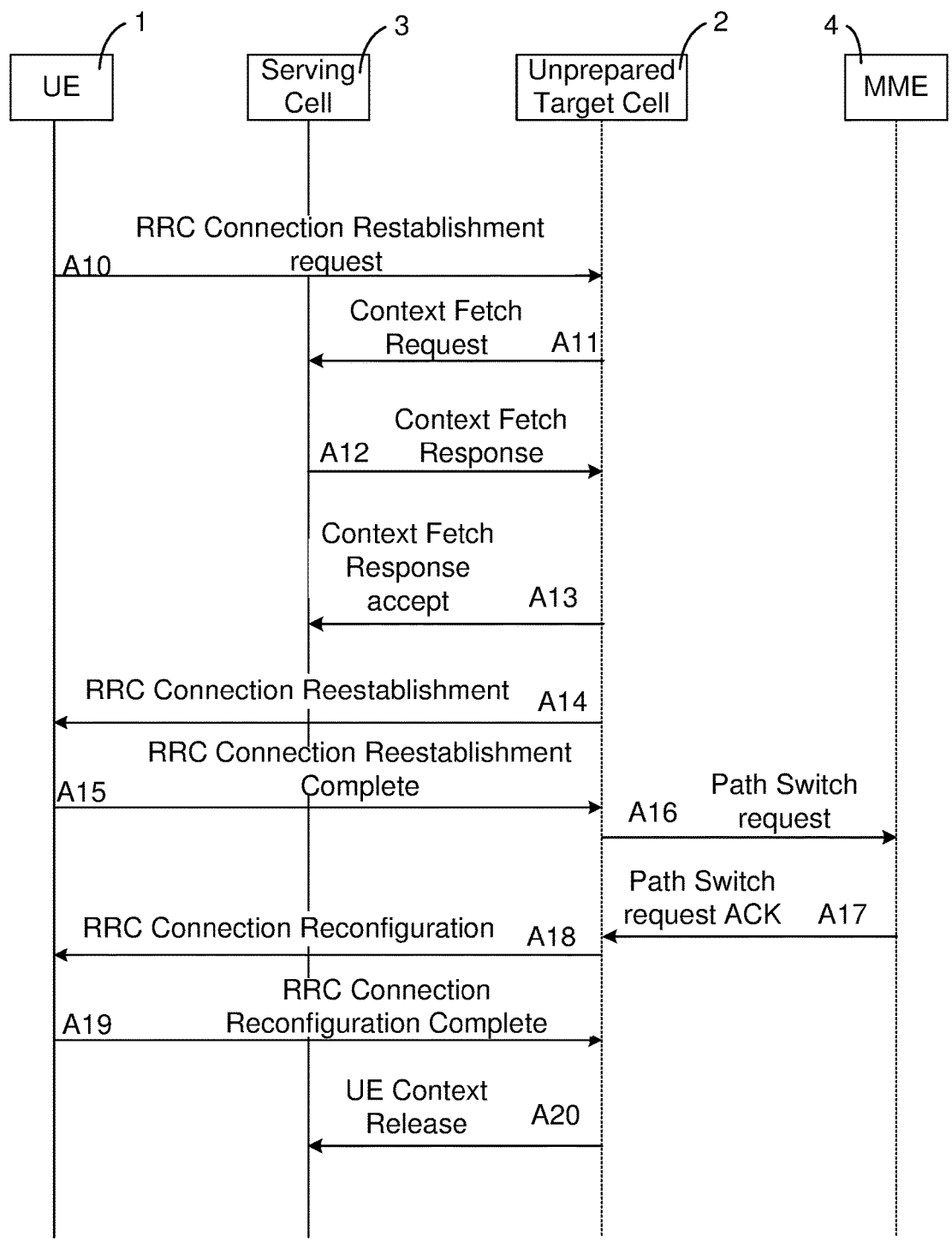
FIG. 6 illustrates signaling of a known RRC re-establishment procedure.

FIG. 6 illustrates in more details the signaling during the re-establishment procedure according to prior art. In general, a serving cell 3 and a target cell 2 may be provided by the same eNB or they may be provided by different eNBs. The present teachings are more relevant for the case that the serving cell is provided by a first eNB (serving eNB) while the target cell is provided by another eNB (target eNB). However, the procedure is the same for both cases. In the following the signaling may be indicated as being to/from serving cell to target cell, although it is realized that signaling is between eNBs controlling the respective cells.

At arrow A10 (corresponding to arrow A3 of FIG. 1), the UE 1 sends the RRC connection re-establishment request to the target cell of an (unprepared) target eNB 2.

At arrows A12, A12 and A13, the context for the UE 1 is obtained. In case of a single eNB controlling both cells, this signaling is within the eNB. In case the source and target cells are controlled by different eNBs, the signaling is between these eNBs, i.e. between the source eNB and the target eNB, this signaling is then performed over X2 interface in case of LTE.

At arrow A14 (corresponding to arrow A6a of FIG. 4a) the target cell sends the "RRC connection re-establishment"-message to the UE 1.

At arrow A15 (corresponding to arrow A7 of FIGS. 1 and 4a) the UE 1 sends the "RRC connection re-establishment complete"-message to the target cell.

The target cell receives the acknowledgment from the UE 1, and at arrow A16, the target cell 2 then sends a request to a mobility management entity (MME) 4 requesting a path switch from the source cell 3 to the target cell 2. The path switch message informs the MME 4 that the UE 1 has changed cell. Once the path switch is performed, acknowledged at arrow A17, the connection is continued from the target cell 2, which is now the serving cell.

At arrow A18, the UE 1 is reconfigured, and at arrow A19, the reconfiguration is completed. Finally, at arrow A20, the target cell sends a message to the serving cell that the serving cell should release the context for the UE 1. In the context release message the target cell eNB informs the source cell eNB that the handover was successful and triggers the release of resources by the source cell eNB.

In the "RRC Connection Re-establishment Request" message, described e.g. with reference to FIG. 2, only the physical cell identity (PCI) of the source cell and the C-RNTI related to the UE identity (when established in the source eNB 3) are provided to the target eNB 2. This information is used by the target cell (target eNB) to uniquely identify the source cell (source eNB) and then to fetch the UE's context related to this source cell. This information is communicated on the X2 Interface that is used in LTE for communication between eNBs.

However, as mentioned in the background section, if the X2 interface is not available for some reason, e.g. due to the operator not configuring the X2 interface, due to virtual local area network (VLAN) issues, due to inter-vendor issues, etc., the target eNb 2 will not be able to fetch the UE-Context from source eNb 3 and the re-establishment will fail. An "RRC Connection Re-establishment Reject" message will then be sent to the UE, as described with reference to FIG. 4b.

Further, there can be a PCI conflict when a cell has multiple neighbors with the same PCI and it may then happen that the target eNB 2 tries to fetch the UE context from the wrong source eNB, again resulting in a failed re-establishment of the connection.

Still further, if the PCI belongs to a non-neighbor cell, the source eNb 3 cannot uniquely identify the PCI, leading again to a failed re-establishment and an RRC Connection Re-establishment Reject message being sent to the UE 1. This since the PCI will not be found in the mapping to the globally unique cell identifier in the source eNB and there will be no communication with that particular target eNB 2 through X2. In fact, X2 will not even exist as they are not neighbors, and again failed re-establishment results.

Briefly, the inventors have identified the above described shortcomings of prior art, and the present teachings aim at removing these shortcomings and make the re-establishment process more efficient and reliable. The significance of the teachings would be evident for instance in the following scenarios:

When the source and target cell are not defined as neighbors (e.g. not present in a respective neighbor relations list), When an interface (e.g. X2 interface in case of LTE) doesn't exist between the source and target cell for communication them between, Existence of PCI conflict with source cell from another nearby cell in vicinity of the target cell.

Figure 7:
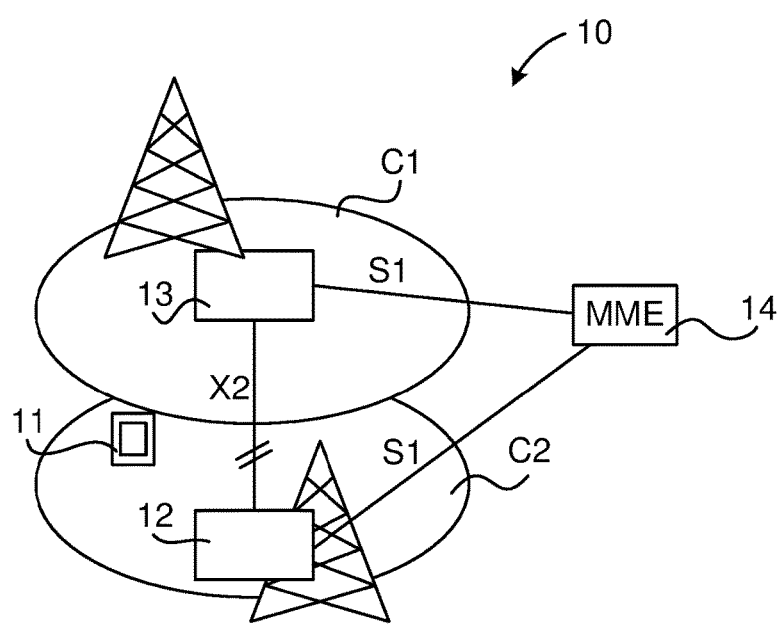
FIG. 7 illustrates schematically an environment in which embodiments according to the present teachings may be implemented.

FIG. 7 illustrates schematically an environment in which embodiments according to the present teachings may be implemented. A communications system 10 comprises an access network implementing e.g. LTE. The access network comprises a number of network nodes, e.g. eNBs 12, 13 providing wireless communication to communication device 11. The communication device 11 may comprise e.g. a smart phone, tablet computer etc., and will in the following be denoted UE 11. Each such network node 12, 13 controls one or more geographical areas, denoted cells C1, C2, in which the wireless communication is provided. As have been described, an eNB 13 currently serving the UE 11 is denoted source eNB or serving eNB, while any eNB which may be a candidate for taking over the serving of the UE 11 is denoted target eNB 12 or candidate eNB. Between the eNBs there may be a connection over which they may communicate, e.g. X2 interface. However, as noted earlier this connection may not always exist (illustrated in FIG. 7 by two lines crossing the connection).

The communications system 10 also comprises other nodes, e.g. a mobility management entity 14, which may be seen as a key control node of the access network. The MME 14 handles tracking and paging procedures, bearer activation and deactivation procedures, authentication etc.

In various embodiments, the present teachings suggest modifying some Information Elements (IE) in the "RRC Connection Re-establishment Request" message and also the methodology by which the target eNB fetches the UE context from the source eNB. These modifications will remove the described shortcomings of prior art and improve the currently used procedure.

According to various aspects of the present teachings, the same event messages as are used in the current procedure may be used also according to the present teachings; however at least some of the information elements of "RRC Connection Re-establishment Request" messages will be modified to achieve the desired reliability.

FIG. 8 illustrates an example of an RRC connection re-establishment request message according to the present teachings. The RRC Connection Re-establishment Request message carries the re-establishment request to the target eNB and also provides identification of the source eNB from which it is coming, UE's identity in that source cell and a Short-Mac-I for contention resolution purposes, as have been described. This information is indicated in FIG. 8 at encircled numeral 1. In this regards there is no changes towards the prior art, i.e. encircled numeral 1 of FIG. 8 is the same information as indicated at encircled numeral 1 of FIG. 2.

However, in FIG. 8, at encircled numeral 2, instead of "physical cell ID" being PCI as in prior art, the CGID is used. Further, according to the present teachings, and in contrast to prior art, a Globally Unique Mobility Management Entity Identifier (GUMMEI) may be included in the RRC connection re-establishment request message. The GUMMEI comprises Public Land Mobile Network (PLMN) identity, a Mobility Management Entity (MME) group identity and an MME code, and uniquely identifies the MME that currently manages the UE 11. In various embodiments according to the present teachings, the GCIS is used for uniquely identifying the source eNB from which the UE 11 is coming, and the PCI may be omitted.

In the prior art methodology, the source eNB cell is identified by PCI. However, as have been described, this can lead to confusion due to PCI conflicts and also mismatches of PCI mappings to the globally unique cell identifier, in case the source cell is not a neighbor of target cell. The present teachings therefore suggest using the Cell Global Identity (CGID) instead of PCI. By having the UE 11 transmit the CGID in the message to the target eNB 12, the target eNB 12 will be able to uniquely find out the source eNB cell in the communications network 10 and all the confusions due to PCI being used for identifying the source eNB cell will be eliminated. The CGID is readily available with the UE 11, as is described next with reference to FIG. 9.

Using CGID will also help to identify a cell uniquely; even when the source eNB cell is not a neighbor of the target cell and can perform the next process of fetching the UE context from this cell source eNB cell.

FIG. 9 illustrates CGID availability in SIB 1 of a serving cell. As mentioned, the CGID is readily available to the UE from the SIB 1 signaling which is performed periodically by the eNBs. At the right-hand side of FIG. 9, message details for the System Information Block type 1 message are illustrated. In this SIB 1 message, the UE may easily obtain the cell identity, as indicated by the arrow pointing at the information in the message details highlighted by a box. The UE may thus obtain this information and insert it in the re-establishment request that it sends to the target eNB.

Figure 10:
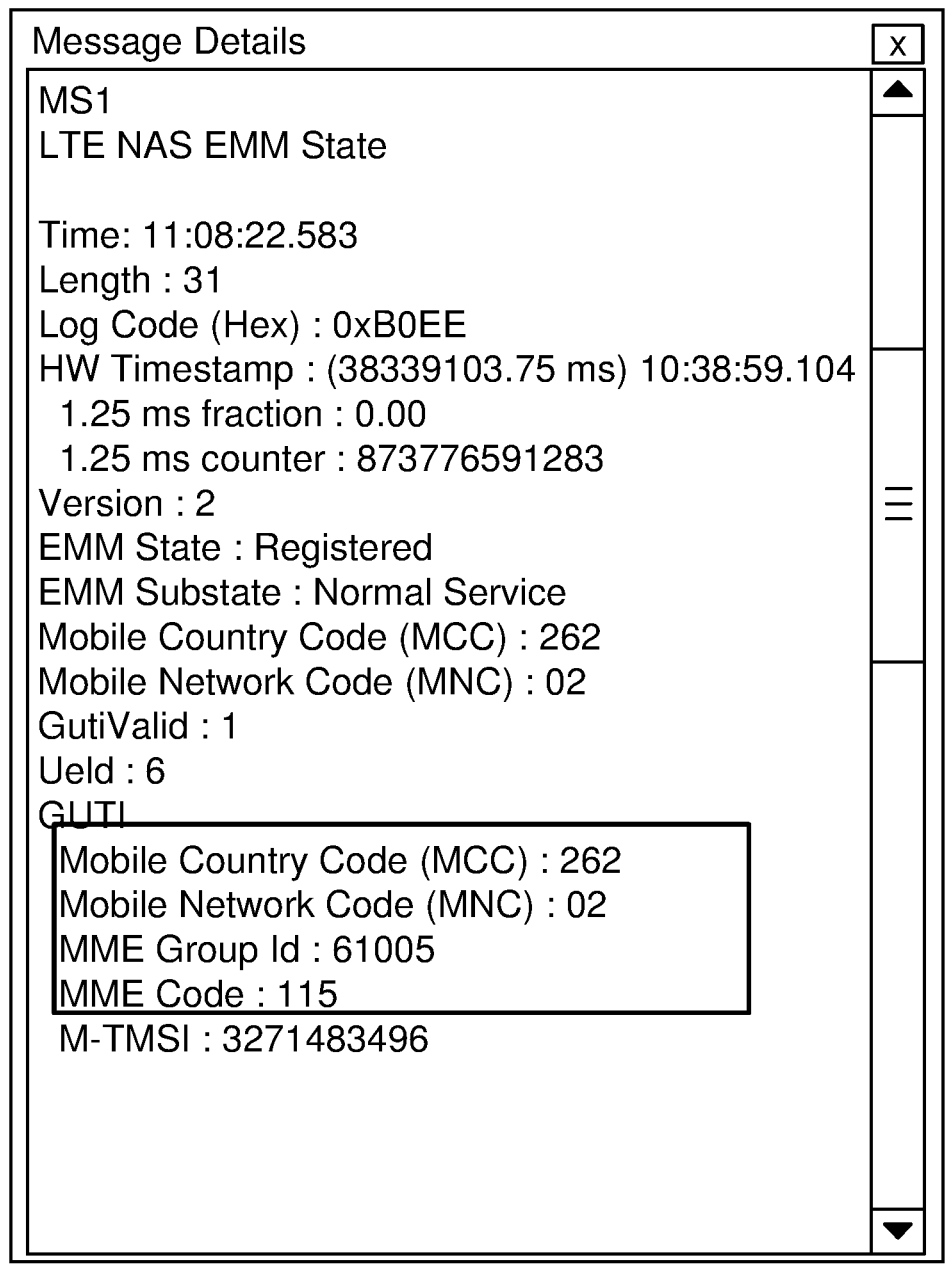
FIG. 10 illustrates GUMMEI information available in an RRC connection request message.

FIG. 10 illustrates GUMMEI information available in an RRC connection request message. The illustrated message details are details of RRC a connection request message that is received by the UE while establishing a fresh RRC connection. The UE may thus obtain this GUMMEI information and insert it in the RRC re-establishment request that it sends to the target eNB.

As mentioned earlier, if the X2-Interface is not available, UE context cannot be fetched from the source cell. By providing, to the target eNB, the MME-ID (GUMMEI) of the MME which the UE is registered to, and/or the CGID, the target eNB can fetch the UE context using this MME information and the re-establishment can successfully take place, even in the case where X2 interface is non-existent.

Fetching the UE context is an important step in the re-establishment, as the target eNB fetches the information about the UE 11 from its previous source eNB in this step. This information is of utmost importance to continue the connection in new cell (without having to start the connection from beginning).

In cases where X2 interface exists and is working, the fetching will take place through X2 itself according to prior art, as described with reference to FIG. 6. Instead of using the PCI as in prior art, the CGID is used.

Figure 11:
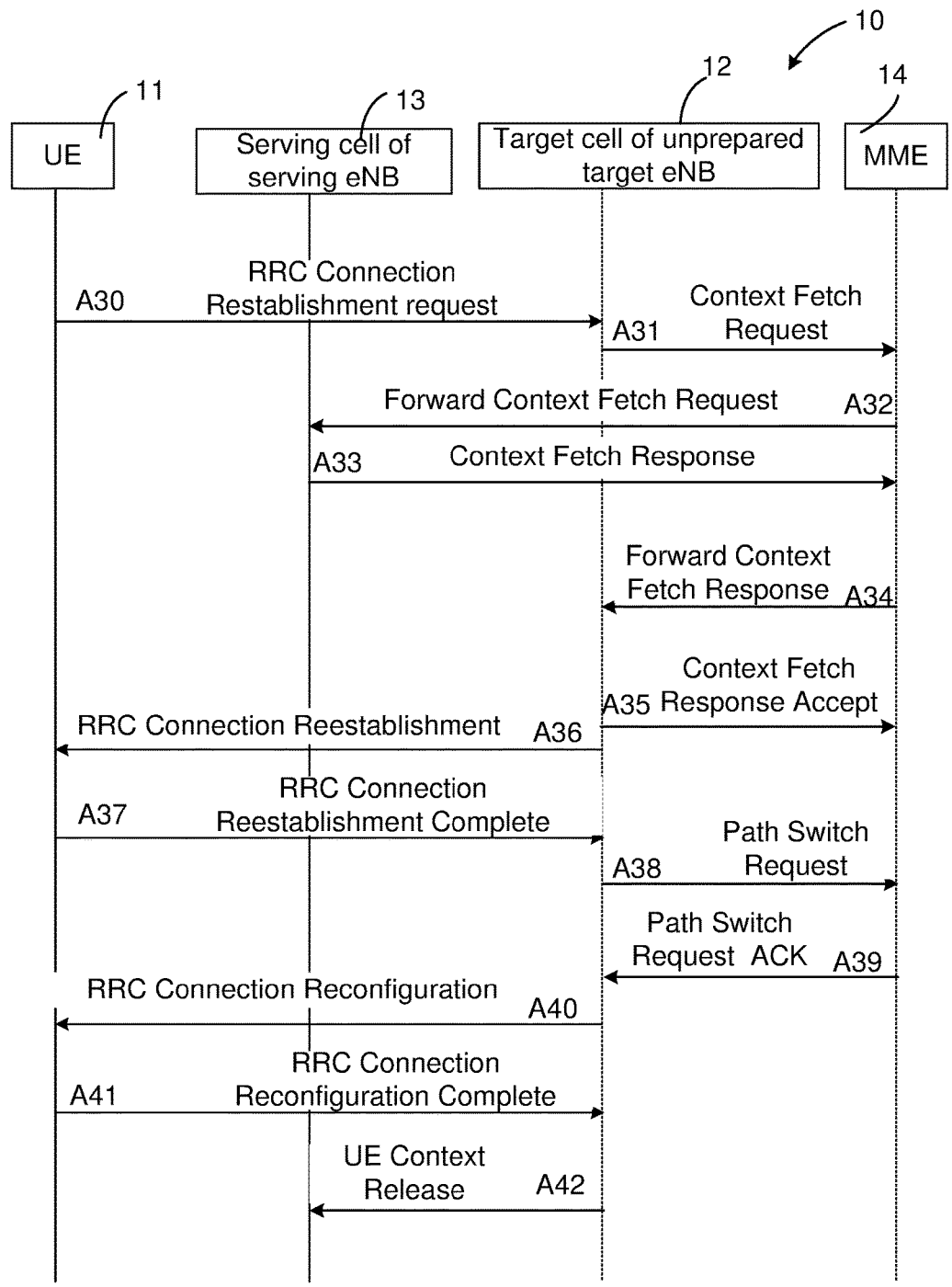
FIG. 11 illustrates signaling of a RRC re-establishment procedure according to the present teachings.

FIG. 11 illustrates signaling of a RRC re-establishment procedure according to the present teachings.

At arrow A30, the UE 11 sends the RRC connection re-establishment request to the target cell of an unprepared target eNB 12. In the following target cell and target eNB may be used interchangeably, but it is understood that the target cell is a cell controlled by the target eNB. In cases where X2 doesn't exist, the target eNB 12 will try to fetch the UE context using the MME-ID obtained from the "RRC Connection Re-establishment Request" that it received from the UE 11. According to the present teachings, the MME-ID is included in this request message.

The target eNB 12 now knows the MME-ID and contacts the MME 14 to fetch the UE context from the source eNb 13 that is identified by the provided CGI. In particular, at arrow A31, the target eNB 12 sends a context fetch request to the MME 14.

When this UE context fetch request is received by the MME 14, it forwards the request to the cell (serving cell of the source eNB 13) that is identified by the C-RNTI of the UE 11 whose context is required. Thus, at arrow A32 the MME 14 forwards the context fetch request to the source eNB 13.

Upon receiving the request, the source eNB 13 acknowledges it and provides the UE context corresponding to that C-RNTI to the MME 14 (arrow A33). The MME 14 in turn forwards (arrow A34) the context fetch message to the target eNB 12. The target eNB 12 may acknowledge this (arrow A35) by sending to the MME 14 a context fetch response accept message.

The target eNb 12 now has all the information it needs to re-establish the call and therefore it sends the "RRC Connection Re-establishment" message (arrow A36) to the UE 11 approving the re-establishment. This message is acknowledged by the UE 11 by the UE 11 sending the "RRC Connection Re-establishment Complete" message (arrow A37) to the target eNB 12. The re-establishment has now been carried out successfully.

At arrows A38-A42, the signaling corresponding to arrows A16-A20 of FIG. 6 is carried out, the description of which are therefore not repeated here.

The different embodiments and features that have been described may be combined in various ways, examples on which are given in the following with reference first to FIG. 12.

Figure 12:
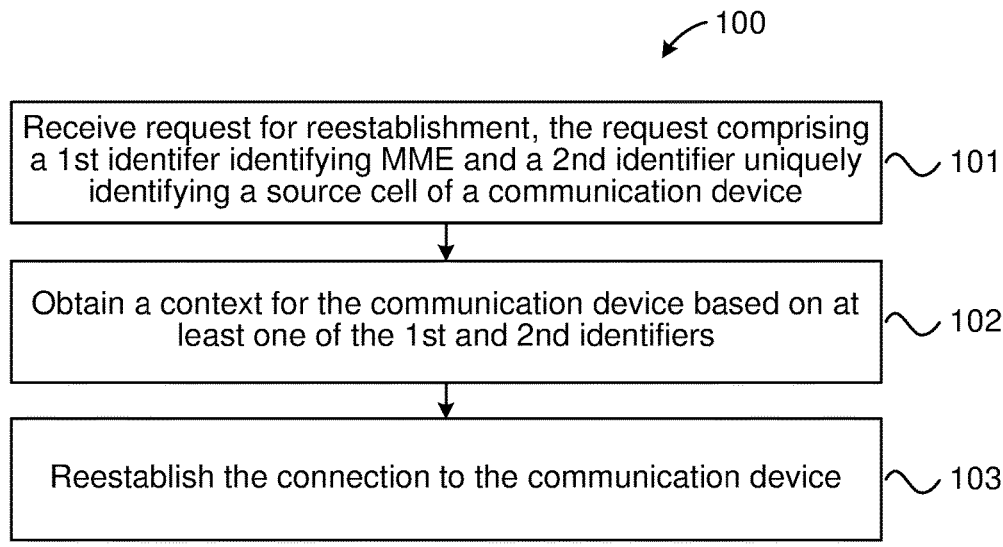
FIG. 12 illustrates a flow chart over steps of an embodiment of a method in a target network node in accordance with the present teachings.

FIG. 12 illustrates a flow chart over steps of an embodiment of a method 100 in a target network node in accordance with the present teachings. The method 100 may be performed in a target network node 12 for re-establishing a connection to a communication device 11. The target network node 12 may for instance be a base station, e.g. eNB in case of LTE. It may have been established, e.g. through channel measurements, that the communication device 11 has a better channel towards this target network node 12 and that the re-establishment of a connection should be performed towards this network node.

The method 100 comprises receiving 101, from the communication device 11, a request for a re-establishment of the connection, the request comprising a first identifier identifying a management node 14 (e.g. a mobility management node) and a second identifier uniquely identifying a source cell of the communication device 11.

The method 100 comprises obtaining 102 a context for the communication device 11 based on at least one of the first identifier and the second identifier. The context may be obtained based on the first identifier, based on the second identifier or based on both identifiers.

The method 100 comprises re-establishing 103 the connection to the communication device 11. Having the context, the target network node 12 is now able to re-establish the connection and the communication device 11 may continue receive wireless services, with the target network node 12 now as the serving network node.

In an embodiment, the first identifier identifying the management node 14 comprises a Globally Unique Mobility Management Entity Identifier, GUMMEI, of a management node 14 with which the communication device 11 was last registered, and the second identifier uniquely identifying the source cell comprises a Cell Global Identity, CGID, of the source cell to which the communication device 11 was last connected to.

In various embodiments, the obtaining 102 of the context comprises:
  identifying the management node 14 based on the first identifier,
  sending, to the identified management node 14, a context request requesting the context for the communication device 11, and
  receiving, from the identified management node 14, the context for the communication device 11.

In various embodiments, the obtaining 102 of the context comprises:
  identifying a source cell based on at least the second identifier,
  sending, to the identified source cell 13, a context request requesting the context for the communication device 11, and
  receiving, from the identified source cell 13, the context for the communication device 11.

Figure 13:
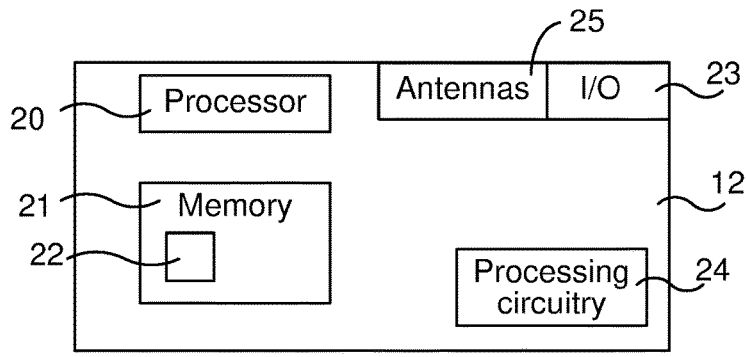
FIG. 13 illustrates schematically a target network node and means for implementing embodiments of the method in accordance with the present teachings.

FIG. 13 illustrates schematically a target network node 12 and means for implementing embodiments of the method in accordance with the present teachings.

The target network node 12 comprises a processor 20 comprising any combination of one or more of a central processing unit (CPU), multiprocessor, microcontroller, digital signal processor (DSP), application specific integrated circuit etc. capable of executing software instructions stored in a memory 21 which can thus be a computer program product 21. The processor 20 can be configured to execute any of the various embodiments of the method for instance as described in relation to FIG. 12.

The memory 21 can be any combination of read and write memory (RAM) and read only memory (ROM), Flash memory, magnetic tape, Compact Disc (CD)-ROM, digital versatile disc (DVD), Blu-ray disc etc. The memory 21 may also comprise persistent storage, which, for example, can be any single one or combination of magnetic memory, optical memory, solid state memory or even remotely mounted memory.

The target network node 12 also comprises an input/output device 23 (indicated by I/O in FIG. 13) for communicating with other entities, e.g. with source network nodes and with other network nodes such as the MME 14. Such input/output device 33 of the target network node 12 may comprise a communication interface.

The target network node 12 may also comprise or control antenna systems etc. for providing the wireless communication to the UE 11.

The target network node 12 may also comprise additional processing circuitry, schematically indicated at reference numeral 24, for implementing the various embodiments according to the present teachings.

The present teachings provide one or more computer programs 22 for the target network node 12. The computer program 22 comprises computer program code, which, when executed on at least one processor 20 on the target network node 12 causes the target network node 12 to perform the method 100 according to any of the described embodiments thereof.

The present disclosure also encompasses computer program products 21 comprising a computer program 22 for implementing the embodiments of the method as described, and a computer readable means on which the computer program 22 is stored. The computer program product 21 may, as mentioned earlier, be any combination of random access memory (RAM) or read only memory (ROM), Flash memory, magnetic tape, Compact Disc (CD)-ROM, digital versatile disc (DVD), Blu-ray disc etc.

A target network node 12 is provided for re-establishing a connection to a communication device 11. The target network node 12 is configured to:
  receive, from the communication device 11, a request for a re-establishment of the connection, the request comprising a first identifier identifying a management node 14 and a second identifier uniquely identifying a source cell of the communication device 11,
  obtain a context for the communication device 11 based on at least one of the first identifier and the second identifier, and
  re-establish the connection to the communication device 11.

The target network node 12 may be configured to perform the above steps e.g. by comprising one or more processors 20 and memory 21, the memory 21 containing instructions executable by the processor 20, whereby the target network node 12 is operative to perform the steps. In case of several processors 20, they may be configured to perform all steps of the method 100 or only part of the steps.

In an embodiment, the first identifier identifying the management node 14 comprises a Globally Unique Mobility Management Entity Identifier, GUMMEI, of a management node 14 with which the communication device 11 was last registered, and wherein the second identifier uniquely identifying the source cell comprises a Cell Global Identity, CGID, of the source cell to which the communication device 11 was last connected to.

In an embodiment, the target network node 12 is configured to obtain the context by:
  identifying the management node 14 based on the first identifier, sending, to the identified management node 14, a context request requesting the context for the communication device 11, and receiving, from the identified management node 14, the context for the communication device 11.

In an embodiment, the target network node 12 is configured to obtain the context by:

identifying a source cell based on at least the second identifier, sending, to the identified source cell 13, a context request requesting the context for the communication device 11, and receiving, from the identified source cell 13, the context for the communication device 11.

The computer program products, or the memories, comprises instructions executable by the processor 20. Such instructions may be comprised in a computer program, or in one or more software modules or function modules.

Figure 14:
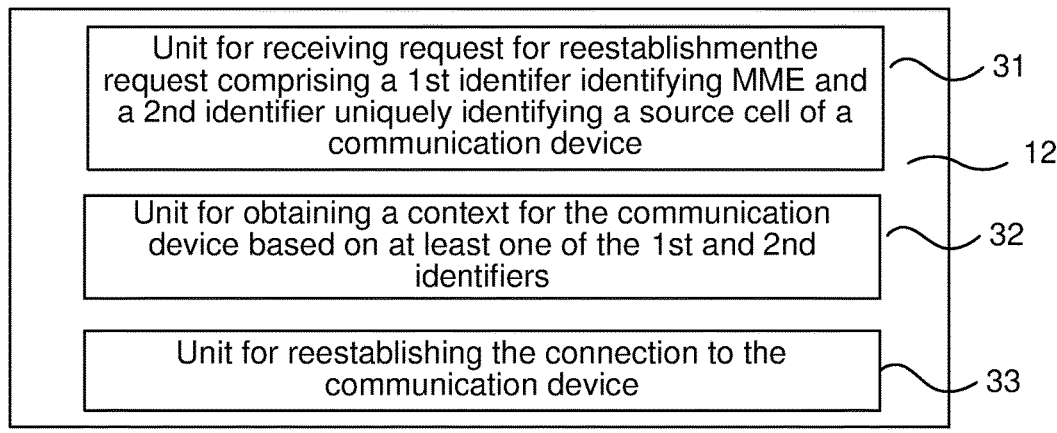
FIG. 14 illustrates a target network node comprising function modules/software modules for implementing embodiments of the present teachings.

FIG. 14 illustrates a target network node comprising function modules/software modules for implementing embodiments of the present teachings. In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A target network node is provided for re-establishing a connection to a communication device. The target network node comprises a first unit 31 for receiving, from the communication device, a request for a re-establishment of the connection, the request comprising a first identifier identifying a management node and a second identifier uniquely identifying a source cell of the communication device.

The target network node comprises a second unit 32 for obtaining a context for the communication device based on at least one of the first identifier and the second identifier.

The target network node comprises a third unit 33 for re-establishing the connection to the communication device.

The target network node may comprise still further units for implementing the steps of the various embodiments of the method 100 in the target network node.

Figure 15:
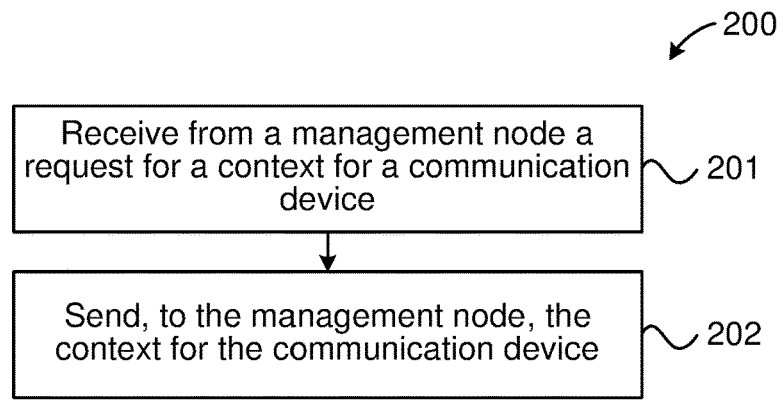
FIG. 15 illustrates a flow chart over steps of an embodiment of a method in a source network node in accordance with the present teachings.

FIG. 15 illustrates a flow chart over steps of an embodiment of a method in a source network node in accordance with the present teachings. The method 200 may be performed in a source network node 13 for re-establishing a connection to a communications device 11. The method 200 comprises:

receiving 201, from a management node 14, a request for a context for the communication device 11, and sending 202, to the management node 14, the context for the communication device 11 in response to the request.

Figure 16:
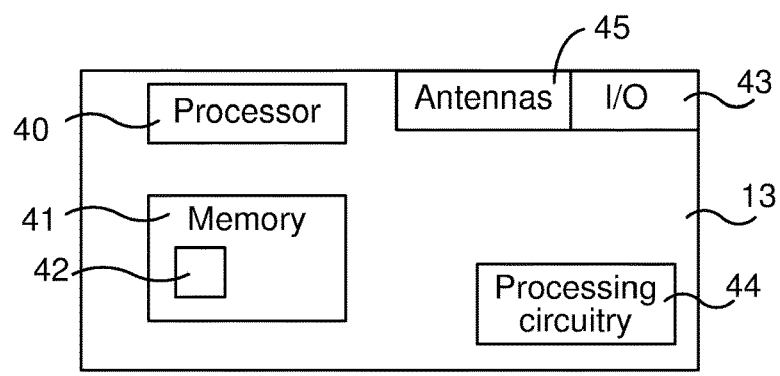
FIG. 16 illustrates schematically a source network node and means for implementing embodiments of the method in accordance with the present teachings.

FIG. 16 illustrates schematically a source network node and means for implementing embodiments of the method in accordance with the present teachings.

The source network node 13 comprises a processor 40 comprising any combination of one or more of a central processing unit (CPU), multiprocessor, microcontroller, digital signal processor (DSP), application specific integrated circuit etc. capable of executing software instructions stored in a memory 41 which can thus be a computer program product 41. The processor 40 can be configured to execute any of the various embodiments of the method for instance as described in relation to FIG. 15.

The memory 41 can be any combination of read and write memory (RAM) and read only memory (ROM), Flash memory, magnetic tape, Compact Disc (CD)-ROM, digital versatile disc (DVD), Blu-ray disc etc. The memory 41 may also comprise persistent storage, which, for example, can be any single one or combination of magnetic memory, optical memory, solid state memory or even remotely mounted memory.

The source network node 13 also comprises an input/output device 43 (indicated by I/O in FIG. 16) for communicating with other entities, e.g. with target network nodes and with other network nodes such as the MME 14. Such input/output device 43 of the source network node 13 may comprise a communication interface.

The source network node 13 may also comprise or control antenna systems etc. for providing the wireless communication to the UE 11.

The source network node 13 may also comprise additional processing circuitry, schematically indicated at reference numeral 44, for implementing the various embodiments according to the present teachings.

The present teachings provide one or more computer programs 42 for the source network node 13. The computer program 42 comprises computer program code, which, when executed on at least one processor 40 on the source network node 13 causes the source network node 13 to perform the method 200 according to any of the described embodiments thereof.

The present disclosure also encompasses computer program products 41 comprising a computer program 42 for implementing the embodiments of the method as described, and a computer readable means on which the computer program 42 is stored. The computer program product 41 may, as mentioned earlier, be any combination of random access memory (RAM) or read only memory (ROM), Flash memory, magnetic tape, Compact Disc (CD)-ROM, digital versatile disc (DVD), Blu-ray disc etc.

A source network node 13 is provided for re-establishing a connection to a communications device 11. The source network node 13 is configured to:

receive, from a management node 14, a request for a context for the communication device 11, and send, to the management node 14, the context for the communication device 11 in response to the request.

The source network node 13 may be configured to perform the above steps e.g. by comprising one or more processors 40 and memory 41, the memory 41 containing instructions executable by the processor 40, whereby the source network node 13 is operative to perform the steps. In case of several processors 40, they may be configured to perform all steps of the method 100 or only part of the steps.

The computer program products, or the memories, comprises instructions executable by the processor 40. Such instructions may be comprised in a computer program, or in one or more software modules or function modules.

Figure 17:
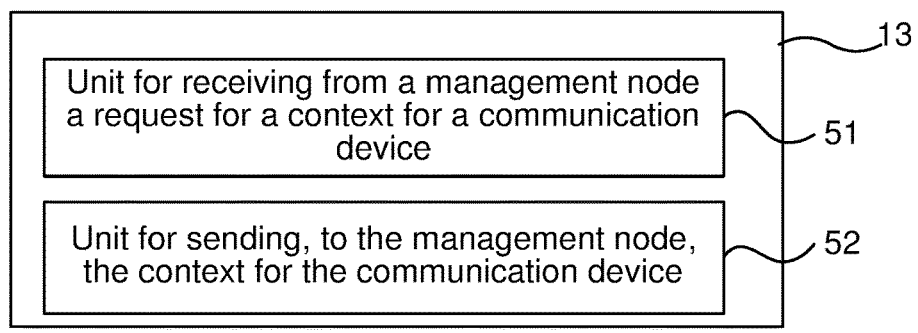
FIG. 17 illustrates a source network node comprising function modules/software modules for implementing embodiments of the present teachings.

FIG. 17 illustrates a source network node comprising function modules/software modules for implementing embodiments of the present teachings. In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A source network node is provided for re-establishing a connection to a communication device. The source network node comprises a first unit 51 for receiving, from a management node 14, a request for a context for the communication device 11.

The source network node comprises a second unit 52 for sending, to the management node 14, the context for the communication device 11 in response to the request.

It is noted that the source network node may be the source network node for a first communication device and a target network node for a second communication device. The source network node as well as the target network node may therefore be configured to perform the method 100 as described with reference to FIG. 12 and also the method 200 as described with reference to FIG. 15.

Figure 18:
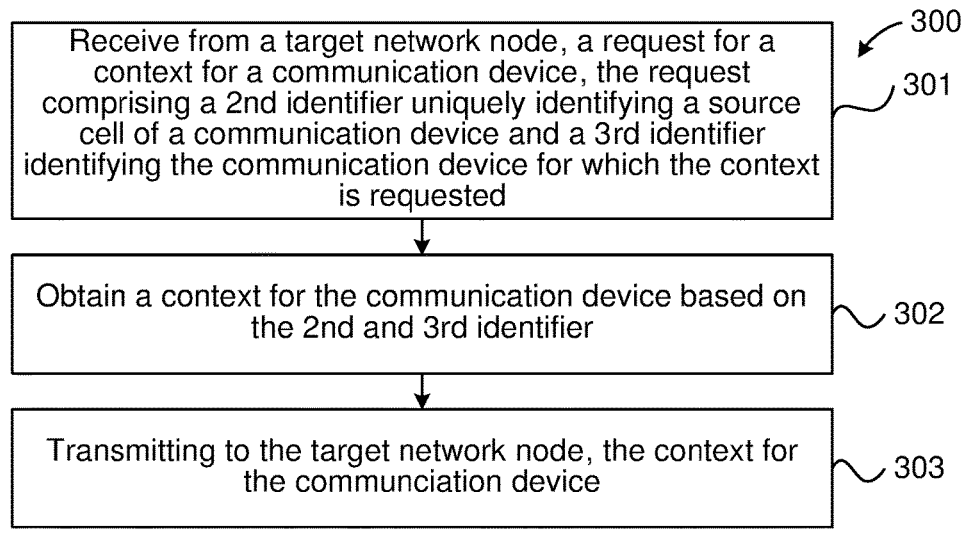
FIG. 18 illustrates a flow chart over steps of an embodiment of a method in a management network node in accordance with the present teachings.

FIG. 18 illustrates a flow chart over steps of an embodiment of a method in a management network node in accordance with the present teachings. The method may be 300 performed in a management network node 14, e.g. the MME in case of LTE, for re-establishing a connection to a communication device 11. The method 300 comprises:

receiving 301, from a target network node 12, a request for a context of the communication device 11, the request comprising a second identifier uniquely identifying a source cell of the communication device 11 and a third identifier identifying the communication device 11 for which the context is requested, obtaining 302 a context for the communication device 11 based on the second identifier and third identifier, and transmitting 303, to the target network node 12, the context for the communication device 11.

In an embodiment, the second identifier uniquely identifying the source cell comprises a Cell Global Identity, CGID, of the source cell to which the communication device 11 was last connected, and wherein the third identifier identifying the communication device 11 comprises a temporary Cell Radio Network Temporary Identifier, C-RNTI.

In various embodiments, the obtaining 302 comprises:
identifying the source cell of the communication device 11 based on the second identifier,
sending, to the identified source cell, a context request requesting the context for the communication device 11, the request comprising the third identifier, and
receiving, from the identified source cell, the context for the communication device 11.

Figure 19:
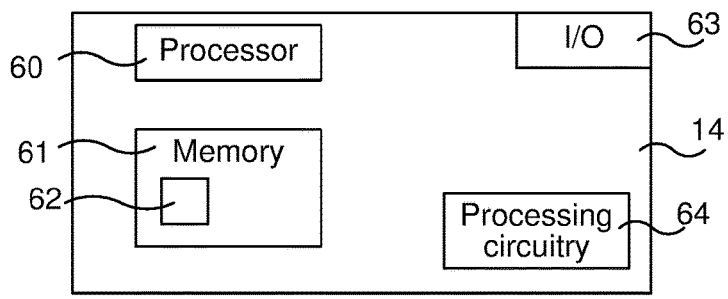
FIG. 19 illustrates schematically a management network node and means for implementing embodiments of the method in accordance with the present teachings.

FIG. 19 illustrates schematically a management network node and means for implementing embodiments of the method in accordance with the present teachings.

The management network node 14 comprises a processor 60 comprising any combination of one or more of a central processing unit (CPU), multiprocessor, microcontroller, digital signal processor (DSP), application specific integrated circuit etc. capable of executing software instructions stored in a memory 61 which can thus be a computer program product 61. The processor 60 can be configured to execute any of the various embodiments of the method for instance as described in relation to FIG. 18.

The memory 61 can be any combination of read and write memory (RAM) and read only memory (ROM), Flash memory, magnetic tape, Compact Disc (CD)-ROM, digital versatile disc (DVD), Blu-ray disc etc. The memory 61 may also comprise persistent storage, which, for example, can be any single one or combination of magnetic memory, optical memory, solid state memory or even remotely mounted memory.

The management network node 14 also comprises an input/output device 63 (indicated by I/O in FIG. 19) for communicating with other entities, e.g. with target and source network nodes and with other network nodes such as gateways of external packet data networks etc. Such input/output device 63 may comprise one or more communication interfaces, e.g. S1 interface in case of LTE.

The management network node 14 may also comprise additional processing circuitry, schematically indicated at reference numeral 64, for implementing the various embodiments according to the present teachings.

The present teachings provide one or more computer programs 62 for the management network node 14. The computer program 62 comprises computer program code, which, when executed on at least one processor 60 on the management network node 14 causes the management network node 14 to perform the method 300 according to any of the described embodiments thereof.

The present disclosure also encompasses computer program products 61 comprising a computer program 62 for implementing the embodiments of the method as described, and a computer readable means on which the computer program 62 is stored. The computer program product 61 may, as mentioned earlier, be any combination of random access memory (RAM) or read only memory (ROM), Flash memory, magnetic tape, Compact Disc (CD)-ROM, digital versatile disc (DVD), Blu-ray disc etc.

A management network node 14 is provided for re-establishing a connection to a communication device 11. The management network node 14 is configured to:
receive, from a target network node 12, a request for a context of the communication device 11, the request comprising a second identifier uniquely identifying a source cell of the communication device 11 and a third identifier identifying the communication device 11 for which the context is requested,
obtain a context for the communication device 11 based on the second identifier and third identifier, and
transmit, to the target network node 12, the context for the communication device 11.

The management network node 14 may be configured to perform the above steps e.g. by comprising one or more processors 60 and memory 61, the memory 61 containing instructions executable by the processor 60, whereby the management network node 14 is operative to perform the steps. In case of several processors 60, they may be configured to perform all steps of the method 300 or only part of the steps.

In an embodiment, the second identifier uniquely identifying the source cell comprises a Cell Global Identity, CGID, of the source cell to which the communication device 11 was last connected, and wherein the third identifier identifying the communication device 11 comprises a temporary Cell Radio Network Temporary Identifier, C-RNTI.

In an embodiment, the management node 14 is configured to obtain the context by:
identifying the source cell of the communication device 11 based on the second identifier,
sending, to the identified source cell, a context request requesting the context for the communication device 11, the request comprising the third identifier, and
receiving, from the identified source cell, the context for the communication device 11.

The computer program products, or the memories, comprises instructions executable by the processor 60. Such instructions may be comprised in a computer program, or in one or more software modules or function modules.

Figure 20:
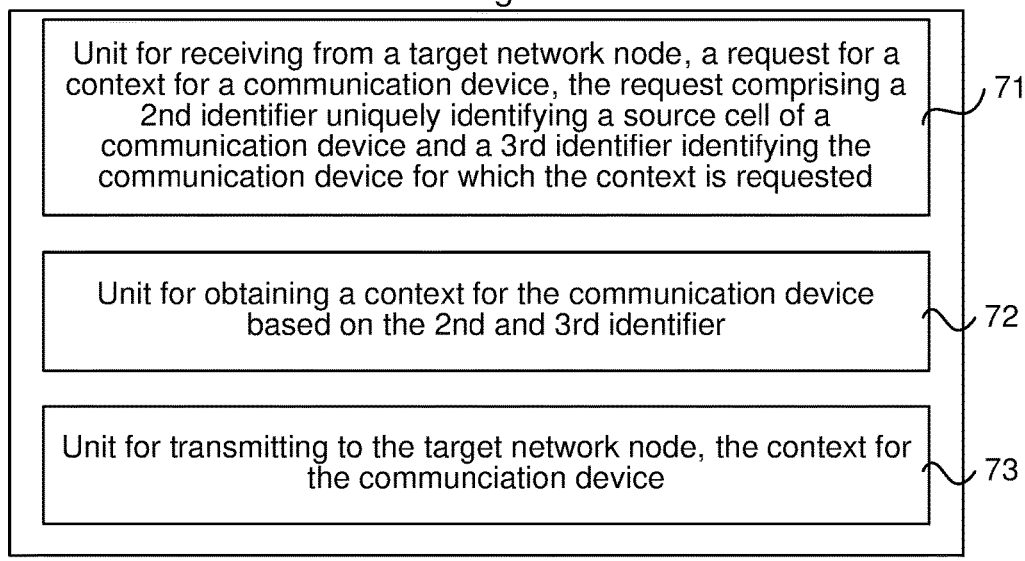
FIG. 20 illustrates a management network node comprising function modules/software modules for implementing embodiments of the present teachings.

FIG. 20 illustrates a management network node comprising function modules/software modules for implementing embodiments of the present teachings. In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

The management network node comprises a first unit 71 for receiving, from a target network node, a request for a context of the communication device, the request comprising a second identifier uniquely identifying a source cell of the communication device and a third identifier identifying the communication device for which the context is requested.

The management network node comprises a second unit 72 for obtaining a context for the communication device 11 based on the second identifier and third identifier.

The management network node comprises a third unit 73 for transmitting, to the target network node, the context for the communication device.

Figure 21:
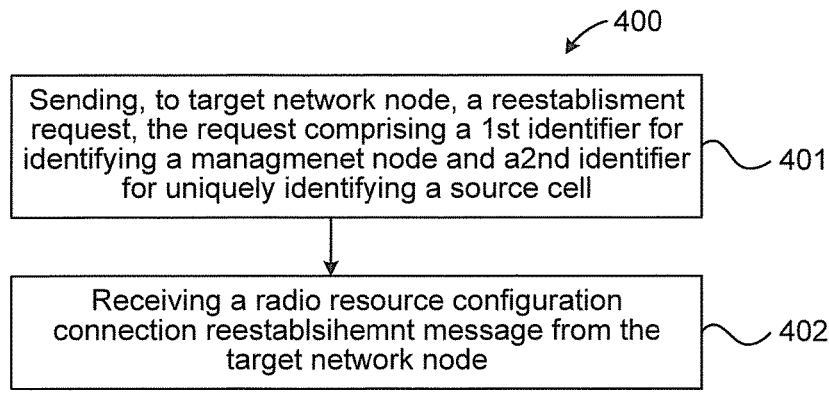
FIG. 21 illustrates a flow chart over steps of an embodiment of a method in a communication device in accordance with the present teachings.

FIG. 21 illustrates a flow chart over steps of an embodiment of a method 400 in a communication device 11 in accordance with the present teachings. The method 400 may be performed in a communication device 11 for re-establishment of a connection to a communications network 10. The method 400 comprises:

sending 401, to a target network node 12, a request for a re-establishment of the connection, the request comprising a first identifier identifying a management node 14 and a second identifier uniquely identifying a source cell of the communication device 11, and receiving 402 in response to the request a radio resource configuration connection re-establishment message from the target network node 12, enabling the communication device 11 to re-establish the connection to the communications network 10.

The communication device 11 sends the first identifier identifying a management node 14 which it was registered to before the error (e.g. link failure) occurred in the re-establishment request that it sends to the target eNB cell. This enables the target eNB to obtain the context for the communication device 11 by using the first identifier and obtain the context from the serving eNB via the management node 14.

In an embodiment, the first identifier identifying the management node 14 comprises a Globally Unique Mobility Management Entity Identifier, GUMMEI, of a management node with which the communication device 11 was last registered, and wherein the second identifier uniquely identifying the source cell comprises a Cell Global Identity, CGID, of the source cell to which the communication device 11 was last connected to.

Figure 22:
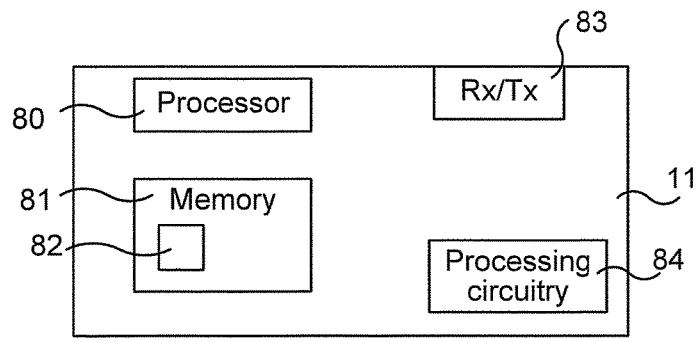
FIG. 22 illustrates schematically a communication device and means for implementing embodiments of the method in accordance with the present teachings.

FIG. 22 illustrates schematically a communication device 11 and means for implementing embodiments in accordance with the present teachings.

The communication device 11 comprises a processor 80 comprising any combination of one or more of a central processing unit (CPU), multiprocessor, microcontroller, digital signal processor (DSP), application specific integrated circuit etc. capable of executing software instructions stored in a memory 81 which can thus be a computer program product 81. The processor 80 can be configured to execute any of the embodiments of the method for instance as described in relation to FIG. 21.

The memory 81 can be any combination of read and write memory (RAM) and read only memory (ROM), Flash memory, magnetic tape, Compact Disc (CD)-ROM, digital versatile disc (DVD), Blu-ray disc etc. The memory 81 may also comprise persistent storage, which, for example, can be any single one or combination of magnetic memory, optical memory, solid state memory or even remotely mounted memory.

The communication device 11 also comprises an input/output device 83 (indicated by Rx/Tx in FIG. 22) for communicating with other entities, e.g. with source and target network nodes. Such input/output device 83 of the communication device 11 may comprise a communication interface for communication according to e.g. LTE, antennas and receiver chains and transmitting chains.

The target network node 12 may also comprise additional processing circuitry, schematically indicated at reference numeral 24, for implementing the various embodiments according to the present teachings.

The present teachings provide one or more computer programs 82 for the communication device 11. The computer program 82 comprises computer program code, which, when executed on at least one processor 80 on the communication device 11 causes the communication device 11 to perform the method 400 according to any of the described embodiments thereof.

The present disclosure also encompasses computer program products 81 comprising a computer program 82 for implementing the embodiments of the method as described, and a computer readable means on which the computer program 82 is stored. The computer program product 81 may, as mentioned earlier, be any combination of random access memory (RAM) or read only memory (ROM), Flash memory, magnetic tape, Compact Disc (CD)-ROM, digital versatile disc (DVD), Blu-ray disc etc.

A communication device 11 is provided for re-establishment of a connection to a communications network 10. The communication device 11 is configured to:

send, to a target network node 12, a request for a re-establishment of the connection, the request comprising a first identifier identifying a management node 14 and a second identifier uniquely identifying a source cell of the communication device 11, and receive in response to the request a radio resource configuration connection re-establishment message from the target network node 12, enabling the communication device 11 to re-establish the connection to the communications network 10.

The communication device 11 may be configured to perform the above steps e.g. by comprising one or more processors 80 and memory 81, the memory 81 containing instructions executable by the processor 80, whereby the communication device 11 is operative to perform the steps. In case of several processors 80, they may be configured to perform all steps of the method 400 or only part of the steps.

In an embodiment, the first identifier identifying the management node 14 comprises a Globally Unique Mobility Management Entity Identifier, GUMMEI, of a management node with which the communication device 11 was last registered, and wherein the second identifier uniquely identifying the source cell comprises a Cell Global Identity, CGID, of the source cell to which the communication device 11 was last connected to.

The computer program products, or the memories, comprises instructions executable by the processor 80. Such instructions may be comprised in a computer program, or in one or more software modules or function modules.

Figure 23:
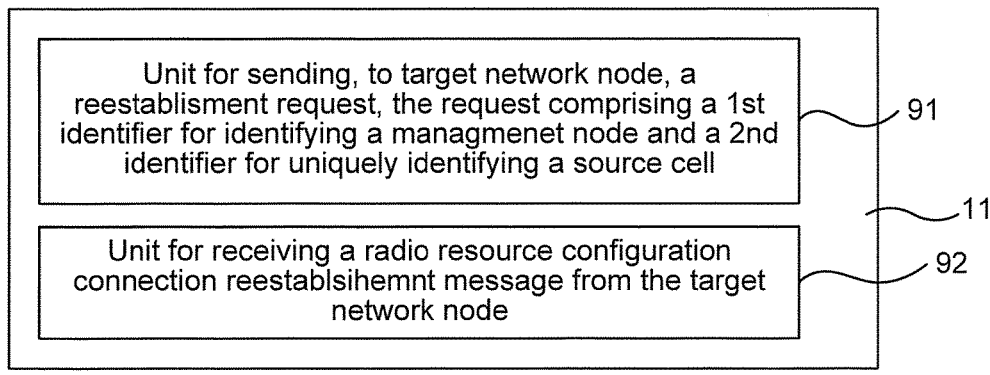
FIG. 23 illustrates a communication device comprising function modules/software modules for implementing embodiments of the present teachings.

FIG. 23 illustrates a communication device comprising function modules/software modules for implementing embodiments of the present teachings. In an aspect, means are provided, e.g. function modules or units, that can be implemented using software instructions such as computer program executing in a processor and/or using hardware, such as application specific integrated circuits, field programmable gate arrays, discrete logical components etc., or any combination thereof.

A communication device 11 provided for re-establishing a connection to a communications network. The communication device 11 comprises a first unit 91 for sending, to a target network node, a request for a re-establishment of the connection, the request comprising a first identifier identifying a management node and a second identifier uniquely identifying a source cell of the communication device.

The communication device 11 comprises a second unit 92 for receiving in response to the request a radio resource configuration connection re-establishment message from the target network node, enabling the communication device to re-establish the connection to the communications network.

The invention has mainly been described herein with reference to a few embodiments. However, as is appreciated by a person skilled in the art, other embodiments than the particular ones disclosed herein are equally possible within the scope of the invention, as defined by the appended patent claims.

The invention claimed is:

1. A method performed in a target network node for re-establishing a connection to a communication device, the method comprising:

receiving, from the communication device, a request for a re-establishment of the connection, the request comprising a first identifier identifying a management node and a second identifier uniquely identifying a source cell of the communication device, wherein the first identifier identifying the management node comprises a Globally Unique Mobility Management Entity Identifier, GUMMEI, of a management node with which the communication device was last registered, and wherein the second identifier uniquely identifying the source cell comprises a Cell Global Identity, CGID, of the source cell to which the communication device was last connected to, obtaining a context for the communication device based on at least one of the first identifier and the second identifier, and re-establishing the connection to the communication device.

2. The method as claimed in claim 1, wherein the obtaining comprises:

identifying the management node based on the first identifier, sending, to the identified management node, a context request requesting the context for the communication device, and receiving, from the identified management node, the context for the communication device.

3. The method as claimed in claim 1, wherein the obtaining comprises:

identifying a source cell based on at least the second identifier, sending, to the identified source cell, a context request requesting the context for the communication device, and receiving, from the identified source cell, the context for the communication device.

4. A target network node for re-establishing a connection to a communication device, the target network node being configured to: receive, from the communication device, a request for a re-establishment of the connection, the request comprising a first identifier identifying a management node and a second identifier uniquely identifying a source cell of the communication device, wherein the first identifier identifying the management node comprises a Globally Unique Mobility Management Entity Identifier, GUMMEI, of a management node with which the communication device was last registered, and wherein the second identifier uniquely identifying the source cell comprises a Cell Global Identity, CGID, of the source cell to which the communication device was last connected to, obtain a context for the communication device based on at least one of the first identifier and the second identifier, and re-establish the connection to the communication device.

5. The target network node as claimed in claim 4, configured to obtain by:

identifying the management node based on the first identifier, sending, to the identified management node, a context request requesting the context for the communication device, and receiving, from the identified management node, the context for the communication device.

6. The target network node as claimed in claim 4, configured to obtain by:

identifying a source cell based on at least the second identifier, sending, to the identified source cell, a context request requesting the context for the communication device, and receiving, from the identified source cell, the context for the communication device.

* * * * *